United States Patent [19]

Deitch et al.

[11] Patent Number: 4,517,559
[45] Date of Patent: May 14, 1985

[54] OPTICAL GATING SCHEME FOR DISPLAY TOUCH CONTROL

[75] Inventors: Leonard Deitch, Skokie; Terrance Knowles, Lincolnshire, both of Ill.

[73] Assignee: Zenith Electronics Corporation, Glenview, Ill.

[21] Appl. No.: 407,419

[22] Filed: Aug. 12, 1982

[51] Int. Cl.³ .............................................. G09G 1/00
[52] U.S. Cl. ................................ 340/712; 340/365 P; 340/794; 340/707; 178/18; 250/221; 250/549
[58] Field of Search ............ 340/127, 365 P, 365 VL, 340/794, 795, 796, 707, 708; 178/18–20; 250/221, 549, 222.1

[56] References Cited

U.S. PATENT DOCUMENTS 3,711,846 1/1973 Schlisser et al. .................... 250/221
4,459,476 7/1984 Weissmueller et al. ......... 340/365 P Primary Examiner—Marshall M. Curtis

[57] ABSTRACT

A touch-operated display for a CRT faceplate includes a plurality of optical gates for energizing light-emitting diodes in response to generation of the CRT raster thus eliminating the need for external switching of the beam generating means to produce the grid of crossing light paths. A frame is disclosed for mounting the light sources, detectors and common optical gates—all of which take the form of silicon chips.

22 Claims, 9 Drawing Figures

OPTICAL GATING SCHEME FOR DISPLAY TOUCH CONTROL

BACKGROUND OF THE INVENTION

This invention is directed generally to improvements in graphics display apparatus and specifically to cathode ray tube (CRT) display apparatus for displaying graphics in response to a viewer touching one or more selected areas on the CRT faceplate.

Conventional graphics display apparatus of the type under consideration include a CRT having a faceplate surrounded by a plurality of light sources and light detectors forming a network or grid of crossing light paths adjacent to the faceplate. Any interruption of a light path or beam, for example by a user touching the faceplate, results in a signal to a CRT graphics controller for changing the graphics displayed in accordance with the area touched and the system computer program. Thus the level of user skill and degree of user knowledge required for effective interaction with the computer are greatly reduced to an ability to read and touch. For obvious reaons these systems are very attractive and greatly enhance the marketability of computers.

A major problem in all such CRT display systems is that of assuring the integrity of each light beam in the grid, that is, to assure that any given light detector responds to light produced by its associated light source and not to light from other sources. There are many well-known schemes for accomplishing this result, all of which are generally referred to in this specification as rejection means. Rejection means have comprised light collimators or tubes to minimize the optical angle of the source, detector or both, elaborate electrical switching arrangements for simultaneously enabling a source and its associated detector and the use of expensive high speed, narrow band sources and detectors. The latter sources and detectors have even been used in switched systems to enhance system noise rejection.

The most commonly used interactive graphics display systems incorporate a form of computerized switching to sequentially energize a plurality of light sources disposed on adjacent sides of the faceplate. In some arrangements the corresponding light detectors, disposed across the faceplate from the sources, are also sequentially energized by the computer.

Needless to say, all such systems involve added complexity and expense to touch-operated graphics interactive display arrangements.

OBJECTS OF THE INVENTION

The principal object of this invention is to provide a novel touch-operated interactive graphics display system.

Another object of this invention is to provide an economical touch-operated interactive CRT graphics display system having excellent noise rejection.

A feature of this invention resides in the use of optical gates for enabling the energy beam grid in response to the CRT raster.

SUMMARY OF THE INVENTION

In accordance with a broad aspect of the invention, there is provided a touch-operated interactive display system including a CRT, scansion means for producing a raster on the faceplate of the CRT, graphics control means for controlling the graphics displayed on the faceplate in response to a user touching selected areas of the faceplate, grid means for producing a grid of crossing energy beams across the faceplate including the selected areas, signal means for generating a signal indicating the faceplate location on any interruption of the grid by a user and means for enabling the grid means by the raster.

BRIEF DESCRIPTION OF THE DRAWINGS

Further objects and advantages of the invention will be apparent from a reading of the following description in conjunction with the drawings in which like reference characters refer to like parts in the various FIGURES and in which.

DETAILED DESCRIPTION

Figure 1:
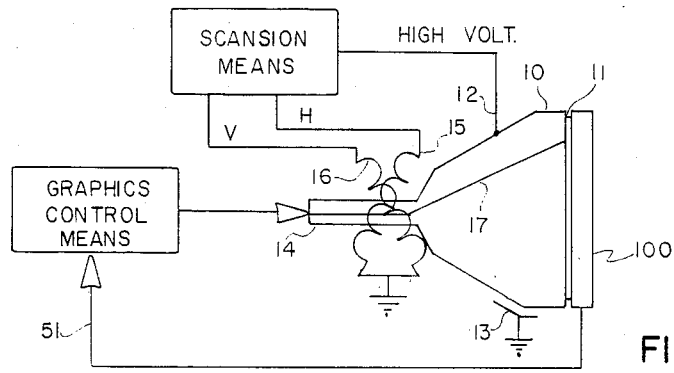
FIG. 1 is a simplified schematic diagram of a CRT graphics display system in accordance with the invention.

Referring to FIG. 1, a graphics display system includes a conventional CRT having a faceplate 11, a high voltage connection 12, a ground connection 13, and a neck 14 including a gun structure (not shown) for developing and directing a beam of electrons 17 toward a phosphor-coated inner surface of faceplate 11, which is maintained at a high voltage. Electron beam 17 is deflected by a pair of deflection coils mounted on the neck of the CRT, with coil 15 deflecting the electron beam in the horizontal direction and coil 16 in the vertical direction. Appropriate voltages are applied to the deflection coils from a block 20 labeled SCANSION MEANS which is indicated as having H and V outputs for horizontal and vertical deflection signals and a high voltage output connected to high voltage terminal 12. CRT 10 is in all respects conventional and its operation and construction are well-known in the art. It may present either a monochrome or color display. An energy beam forming structure or grid means 100, shown mounted adjacent to faceplate 11, is connected to a block 50 indicated as GRAPHICS CONTROL MEANS for driving the gun structure of CRT 10. Signals are conveyed from grid means 100 to graphics control means 50 over a bus 51.

Scansion means 20, in conjunction with deflection coils 15 and 16 and electron beams 17, produce a pattern of spaced horizontal lines or traces across the CRT faceplate. This pattern of electron beam traces is called a raster. In conventional CRTs the inside of the faceplate is coated with photo-emissive phosphors which emit light in response to electron bombardment. Consequently the electron beam, in tracing across the phosphor coating or screen, results in the screen "lighting up". The degree of electron bombardment determines the amount of light emitted by the phosphors and is controlled by the CRT drive circuits.

Figure 2:
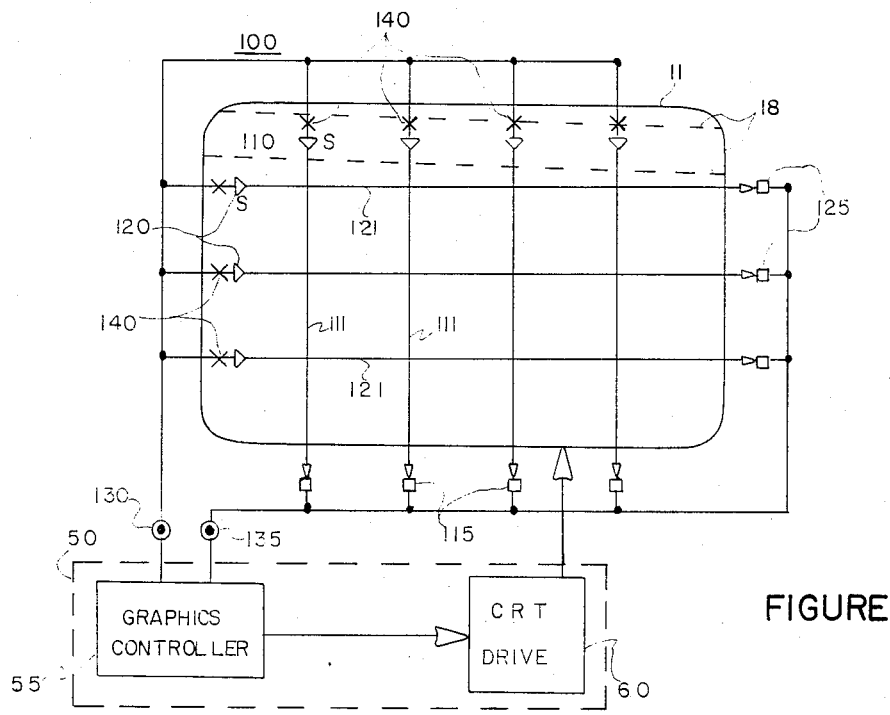
FIG. 2 is a partial schematic diagram illustrating the front surface of the faceplate of the CRT and a number of light sources and detectors arranged for producing a grid of light beams thereacross.

FIG. 2 represents a front view of the CRT faceplate 11. A few dashed horizontal traces 18 are illustrated to represent the scanning of electron beam 17 and generation of the raster. The triangle-shaped devices indicate light sources and the square-shaped devices indicate light detectors. The X's in the connecting leads to the sources indicate that the sources are gated; that is, they are enabled or rendered operative in response to something else. In the instant invention the gates are optical and responsive to the light produced by the raster on the CRT faceplate. A plurality of sources 110 are located across the top horizontal axes of the CRT faceplate and another plurality of similar sources 120 located along the left vertical axis. Sources 110 and 120 are shown within the confines of the faceplate to illustrate that they are optically gated by the light produced by scansion of the electron beam across the phosphor screen on the inner surface of the faceplate.

A corresponding plurality of light detectors 115 is disposed below the faceplate opposite the plurality of light sources 110, with each source being uniquely associated with a corresponding detector. A plurality of similar light detectors 125 is disposed with respect to light sources 120 to the right of the faceplate. The detectors are not illustrated as being on the faceplate since they are not gated by the raster. As those skilled in the art will perceive, the detectors may readily be optically switched, with the sources being unswitched, or both may be switched simultaneously through appropriate electrical interconnections (not illustrated).

The sources are shown coupled to a terminal 130 and the detectors coupled to a terminal 135. In accordance with the invention, terminal 130 need merely be a power connection, unlike the prior art which requires a source of switching voltages or signals for the horizontal and vertically disposed light sources.

Terminal 130 and terminal 135 are shown connected to a block 55 labeled GRAPHICS CONTROLLER which in turn supplies a block 60 labeled CRT DRIVE. Both GRAPHICS CONTROLLER 55 and CRT DRIVE 60 are part of GRAPHICS CONTROL MEANS 50, which CRT drive 60 supplying signals to the CRT.

It will be appreciated that a much larger number of sources and detectors are used in conventional graphics display system. The small number illustrated simplifies system explanation and should not be considered limiting. Sources 110 generate light beams 111 which downwardly traverse the faceplate and are detected by corresponding ones of light detectors 115. Similarly, sources 120 generate light beams 121 which horizontally traverse faceplate 11 and are detected by corresponding ones of light detectors 125. As the CRT electron beam generates the raster by being swept across the inner surface of the faceplate, the optical gates indicated by the X's on the faceplate are enabled and permit enabling or energization of their corresponding sources. As will be seen this is accomplished by connecting the gates in an electrical circuit with the sources. Consequently sequential source illumination occurs in response to generation of the raster with horizontal sources 110 being energized in sequence followed by vertical sources 120 being energized in sequence. The detectors respond and produce a pulse waveform at terminal 135, with each pulse representing detection from a particular one of the detectors. Since the detectors have been assumed to respond to light from their corresponding sources, the pulse waveform represents a cross hatch pattern of light beams across the faceplate. As is well known in the art, the pulse waveform may be analyzed and used to determine (by absence of one or more horizontal and vertical pulses) the precise location of any interruption of the pattern. The crossing light beams cover all selected areas of the faceplate and touching by a user results in interruption of at least one horizontal and one vertical beam. This information (absence of pulses) is supplied back to the computer where the precise location of the interruption is determined. A suitable command is produced by the computer programming for the graphics control means to change the graphics display in accordance with the selected area of the screen that was touched.

This technique is quite well known and need only be briefly described. In a conventional situation a menu, schedule of events, actions, choices or the like is presented to the viewer in the form of a display on the face of the CRT. The display may instruct the viewer to touch the CRT faceplate alongside the desired event, action or choice. For example, the menu may present a bookkeeping format in which a "savings account" and "checking account" are listed. The viewer, by touching the selected area adjacent to "checking account" in effect signals the computer to generate a detailed display of information available relative to the "checking account" file. Touching a selection in this display may then present to the viewer another series of choices to enable interrogation of particulars in the checking account, etc. Thus a highly simplified system for interacting with the computer may be achieved.

Figure 3:
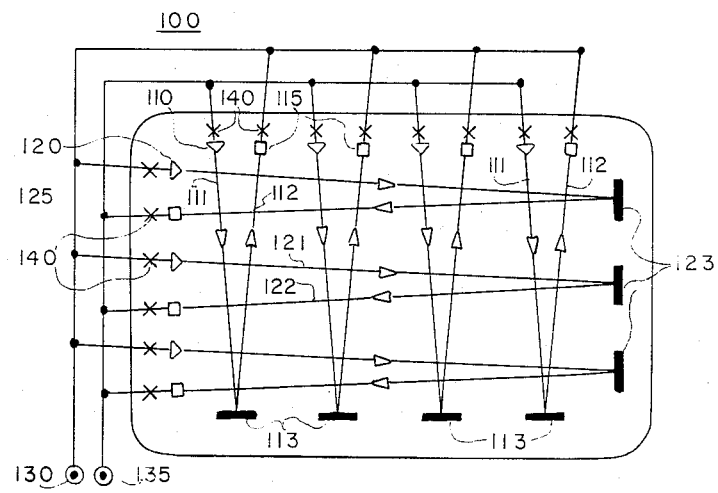
FIG. 3 is a preferred embodiment of the invention.

FIG. 3 illustrates a preferred embodiment of the invention. As in FIG. 2 sources 110 are positioned on faceplate 11 along the top horizontal axis and sources 120 positioned along the left vertical axis. The sources are gated as indicated by the X's in the connecting leads. Here however, detectors 115 are positioned adjacent corresponding ones of their companion sources 110, detectors 125 positioned adjacent corresponding ones of their companion sources 120 and a plurality of reflecting devices 113 and 123 are positioned across the faceplate individually opposite a respective source-detector pair. Specifically, the left hand pair of source 110 and detector 115 is positioned across the faceplate directly above the left hand reflecting device 113. Similarly, the uppermost pair of source 120 and detector 125 is positioned horizontally opposite the topmost reflecting device 123. The light beams produced by sources 110 traverse paths 111 to reflecting devices 113 and are reflected back along paths 112 to detectors 115. Similarly light beams emanating frm sources 120 traverse paths 121 across the faceplate to corresponding reflecting devices 123 where they are reflected back along paths 122 to detectors 125.

In this arrangement the detectors are also indicated as being gated and are shown within the confines of faceplate 11. As will be seen, with the preferred embodiment both the sources and the detectors in each source-detector pair may be conveniently gated simultaneously with a common optical gate. The simultaneous switching of the source and its companion detector results in a very desirable arrangement with enhanced noise rejection. As the electron beam generates the raster the optical gates will be sequentially energized to electrically enable the source-detector pairs. Consequently, output terminal 135 will receive a pulse waveform as before.

Figure 4:
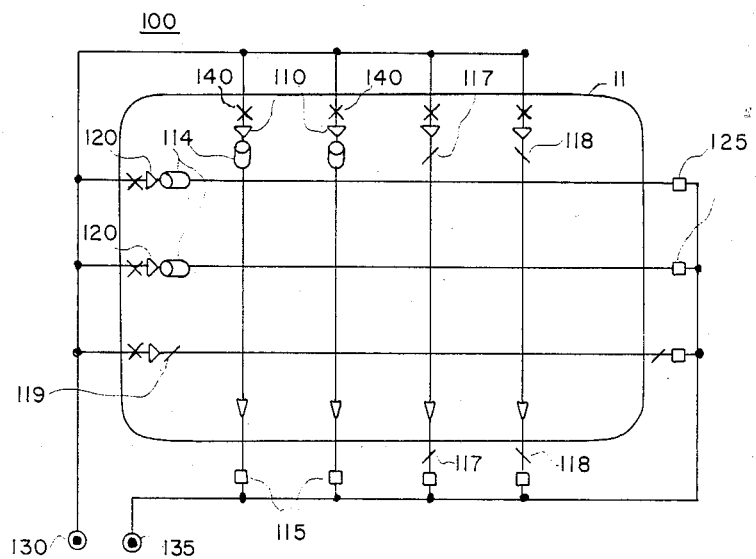
FIG. 4 illustrates an alternate construction to those shown in FIGS. 2 and 3.

In FIG. 4 there is schematically shown, for descriptive purposes only, different arrangements of rejection means for assuring integrity of the light beams; that is, that each detector will only receive or respond to light from its corresponding source. On the left hand portion of the faceplate, a number of cylindrical collimators 114 are illustrated for restricting the optical angle of light emanating from their associated sources 110 and 120. Similar collimators may be used at the detectors if desired for further enhancement of system noise immunity. The two right hand sources 110 have angularly disposed thin rectangles 117 and 118 mounted in the light paths and similarly oriented thin rectangles 117 and 118 respectively, interposed in front of their corresponding detectors. The lower left hand source 120 similarly has angularly disposed rectangles 119 between it and its detector 125. The thin rectangles 117, 118, and 119 represent polarizers for polarizing the light emitted from the sources in a well known manner. The similarly oriented polarizers in front of the detectors assure that the detectors will only respond to correctly polarized light. Since adjacent sources and detectors have appropriately different polarizers interposed in their light paths, the detectors will only respond to light from their corresponding sources and the polarizers thus function as rejection means. These techniques of using collimators and polarizers between the sources and detectors for enhancing the integrity of the beams in the grid are well known in the art and are not part of the invention.

Figure 5:
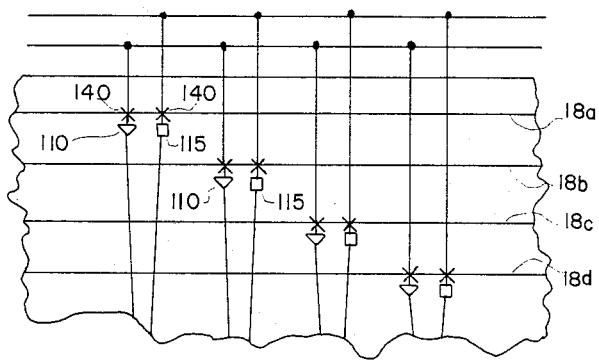
FIG. 5 is a partial illustration of a modified arrangement of the preferred embodiment of FIG. 3 permitting use of less critical gating diodes.

FIG. 5 shown an enlarged section of a faceplate with successive horizontal source-detector pairs offset in the vertical direction. The amount of offset is magnified for illustrative purposes and indicates that the left source-detector pair is energized by electron beam path 18a, the next source-detector pair by the horizontal line made by electron beam path 18b and successive source-detector pairs by horizontal lines 18c and 18d. In a conventional domestic CRT display system a horizontal line is traced in 62 microseconds. Consequently the FIG. 3 arrangement can impose stringent demands upon the rise and fall time characteristic of the sources. The FIG. 5 arrangement reduces such constraints considerably since there is a time delay of a horizontal line between energization of adjacent sources.

Figure 6:
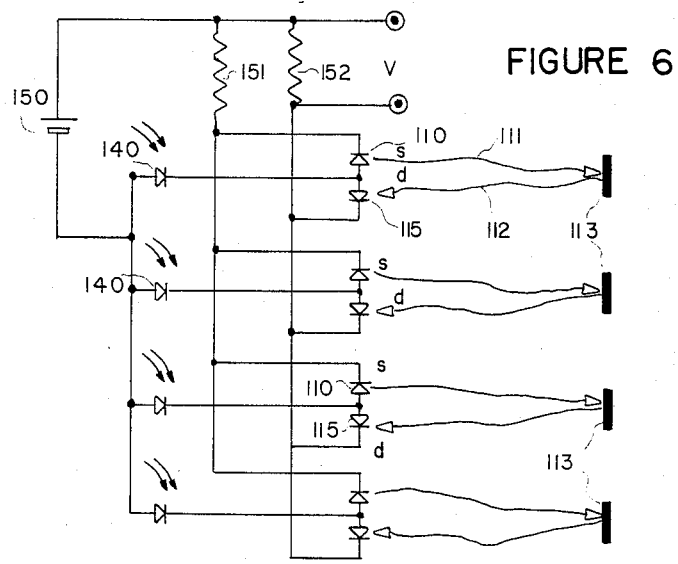
FIG. 6 is a simplified partial schematic diagram of the invention showing a common optical gating arrangement for diode light sources and diode light detectors.

FIG. 6 is a portion of a simplified schematic diagram showing sources 110 as light-emitting diodes, detectors 115 as light detecting diodes and optical gates 140 as photosensitive diodes. A battery 150 supplies DC operating potential for all of the diodes. Each source-detector pair has its anodes connected in common to the cathode of an optical diode 140. The cathode of each source diode 110 is connected to the positive terminal of battery 150 through a load resistor 151. The cathode of each detector diode 115 is similarly connected through a load resistor 152. The output potential is taken across load resistor 152. Light is schematically illustrated as emanating from source diodes 110 along paths 111 and reflected by reflective device 113 along paths 112 to detector diodes 115. The diode gates 140 are shown as responding to light radiation. When, for example, the upper optical diode gate 140 is driven conductive in response to light produced by the CRT raster, it completes a circuit between the battery and upper source diode 110 which emits light along path 111. This light is reflected by upper reflective device 113 along upper path 112 and falls upon upper diode detector 115, which is driven conductive and completes a circuit to the battery, resulting in a potential across load resistor 152. Thus, the optical diode gate triggers or enables both the source diode and the detector diode. In response to the raster, successive ones of gates 140 are driven conductive and energize successive ones of the source-detector pairs, resulting in a pulse waveform across load resistor 152.

Figure 7:
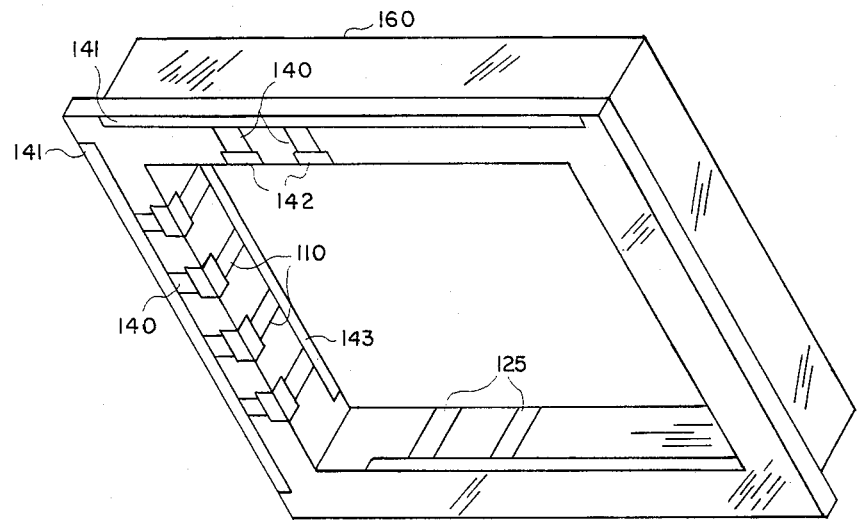
FIG. 7 is an underview of a frame arranged for placement adjacent to the faceplate of a CRT including optical gates, light sources and light detectors in the form of silicon chips mounted thereon.

FIG. 7 illustrates a frame 160 for positioning the optical gates, light sources and light detectors adjacent to the CRT faceplate for producing a grid of crossing light paths. Frame 160 is generally rectangular, preferably molded of an epoxy material and includes a lower surface for close contact with the surface of the CRT faceplate. Optical gates 140 comprise silicon chips mounted on the bottom of the frame for intimate contact with the faceplate. Similarly light sources 110 preferably comprise silicon chips mounted on the inside of an upstanding portion of the frame. The light detectors, corresponding to light sources 110 are not visible in this view, but are also silicon chips mounted on the opposite upstanding portions of the frame in alignment with the sources. Detectors 125 are visible on the lower upstanding portion of frame 160. All the diodes may be conveniently packaged on a tape or deposited directly on the frame in accordance with standard chip packaging and deposition techniques.

The optical gate chips are electrically connected via conductive bus bars 141 which may be of deposited metal or the like. The same is true of conductive bus bar 143 which connects source chips 110. Metallized areas 142 are illustrated as interconnecting optical gates 140 and sources 110. Connections from the elements on the frame to the other circuitry may be made by conventional means. The illustrated arrangement presents a convenient package for the grid producing means which may be held in position adjacent the CRT faceplate in a variety of different ways.

Figure 8:
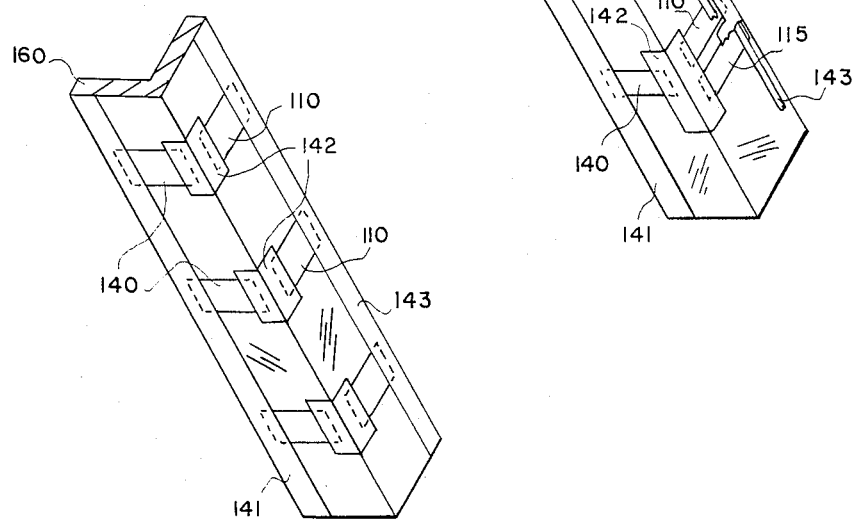
FIG. 8 is a close up of a portion of the frame of FIG. 7.

FIG. 8 shows an enlarged section of a portion of frame 160 to better illustrate the connection of bus bars 141 and 143 and metallized areas 142 to gate chips 140 and source chips 110.

Figure 9:
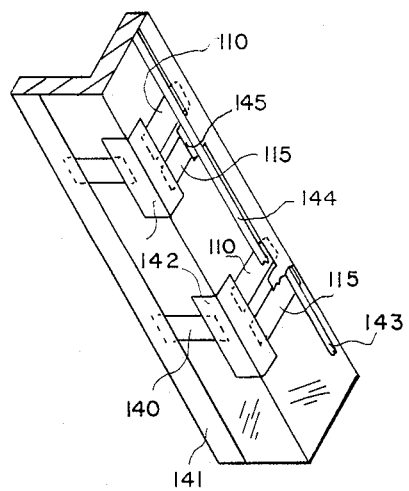
FIG. 9 is a view of a portion of a frame similar to that illustrated in FIG. 7 but for use with the form of the invention shown in FIG. 3.

In FIG. 9 there is shown a similar enlarged section of a frame 160 illustrating an arrangement for the preferred embodiment of the invention shown in FIG. 3 in which the source-detector pairs are adjacent each other and commonly switched by the optical gates. The construction is generally similar to that shown in FIGS. 7 and 8 except for the common connection between sources 110 and detectors 115. Because of the side-by-side arrangement of source and detector, insulation is provided between bus 143 and bus 144. As shown, bus 143 is initially connected to detector chips 115 and a coating or layer of insulating material 145 applied over a portion of the detector chips but not over the source chips. Subsequently a bus 144 is connected to source chips 110. (Bus 144 is insulated from the detector chips by insulating layer 145). The metallized areas 142 connect both source and detector chips in each pair to a corresponding optical gate.

Other arrangements will suggest themselves to those skilled in the art and the particular configurations shown are for illustrative purposes only. It will also be appreciated that discrete devices may be utilized with equal facility rather than devices in chip form. Indeed it will be apparent that in some arrangements, for example where collimators or polarizing means are desired, the frame illustrated may conveniently comprise the vehicle for locating and aligning the collimator tubes or polarizing lenses. It will also be apparent that the frame need not be rectangular, but may be skewed to obtain the arrangement of optical gates shown in FIG. 5.

What has been described is a novel and economical arrangement for producing a touch-sensitive interactive graphics display system for use with a CRT tube in which the grid is enabled by scansion of the CRT faceplate.

What is claimed is:

1. A touch-operated interactive display system including a cathode ray tube having a phosphor covered faceplate and scansion means for energizing the phosphor to illuminate said faceplate;
    graphics control means for controlling the graphics displayed on said faceplate in response to touching of selected areas thereof by the user;
    grid producing means including light beam producing means responsive to the illumination from said faceplate for producing a grid of light beams adjacent said faceplate, said grid including said selected areas; and
    signal means for generating a signal indicative of the faceplate location of any interruption of said grid by a user.

2. The display system set forth in claim 1 wherein said light beam producing means further comprise gating means including a plurality of optical gates in proximity to said faceplate.

3. The display system set forth in claim 2 wherein said light producing means further include;
    a plurality of source and detector pairs in circuit with said optical gates; and
    rejection means restrictively associating the source and detector in each said pair.

4. The display system set forth in claim 3 wherein said rejection means cooperate with said gating means to produce a faceplate illumination enabled gate arrangement for each restrictively associated pair in said light beam producing means.

5. The display system set forth in claim 4 wherein the source and the detector in each said restrictively associated pair are positioned adjacent to each other and further including;
    reflection means positioned across the faceplate for reflecting energy from the source to the detector.

6. The display system set forth in claim 5 wherein the source and the detector in each said restrictively associated pair is connected in circuit with a single optical gate.

7. The display system set forth in claim 6 wherein said scansion means generate a raster and wherein said optical gates are arranged along the horizontal axis to be enabled by different scan lines of the raster.

8. The display system set forth in claim 6 wherein said sources and said detectors are light-emitting and light-detecting, respectively, and wherein said sources, detectors and optical gates comprise silicon chips.

9. The display system set forth in claim 8 wherein said sources and said detectors are light-emitting and light-detecting diodes, respectively, operating in the infrared range.

10. A touch-operated interactive display system including a cathode ray tube having a phosphor covered faceplate and scansion means for producing a raster for energizing the phosphor and illuminating said faceplate;
    graphics control means for controlling the graphics displayed on said faceplate in response to touching of selected areas thereof by a user;
    grid producing means including a plurality of light beam producing means positioned along two axes of said faceplate for producing a grid of crossing light beams adjacent to said faceplate, said grid including said selected areas;
    signal means coupled to said graphics control means for generating a signal indicative of the faceplate location of any interruption of said grid by a user; and
    said light beam producing means including a plurality of optical gates responsive to illumination of said faceplate whereby said light beam producing means are activated to produce said grid of crossing light beams by operation of said optical gates in response to illumination of said faceplate.

11. The display system set forth in claim 10 wherein said light beam producing means include:
    a plurality of light source and light detector pairs; and
    rejection means restrictively associating the source and the detector in each said pair.

12. The display system set forth in claim 11 wherein at least one of said light source and light detector in each said pair is optically switched.

13. The display system set forth in claim 11 wherein the light source and the light detector in each said pair are switched by a common optical gate.

14. The display system set forth in claim 13 wherein the light source and the light detector in each said pair are positioned adjacent to each other along one axis of said faceplate and further including:
    reflection means positioned across said faceplate for reflecting light from said light source to said light detector.

15. The display system set forth in claim 14 wherein said optical gates are vertically offset along the horizontal axis of the cathode ray tube to enable switching of said gates by different horizontal lines in the raster.

16. The display system set forth in claim 13 wherein said light sources, light detectors and said optical gates comprise silicon chips.

17. The display system set forth in claim 16 wherein said light sources and said light detectors operate in the infrared range.

18. The display system set forth in claim 11 further including:
    mechanical means supporting said optical gates adjacent to said faceplate with said optical gates exposed to said raster.

19. The display system set forth in claim 18 wherein said mechanical means also supports said light sources and said light detectors, and wherein said optical gates comprise silicon chips, and further including electrically conductive means electrically interconnecting said silicon chips with corresponding ones of said light sources and light detectors.

20. The display system set forth in claim 12 further including:
    a support mounting said optical gates on position adjacent said faceplate with said optical gates exposed to said raster;

means positioning each said pair along the same axis on said support;

reflection means located on an opposite axis of said support for reflecting light from the light source to the light detector in said pair; and electrically conductive means on said support connecting the source and detector in each said pair with a single optical gate.

21. The display system set forth in claim 11 wherein said rejection means comprise polarizing means between the source and detector in each said pair.

22. The display system set forth in claim 11 wherein said rejection means comprise collimation means between the source and detector in each said pair.

* * * * *